United States Patent
Ming et al.

(10) Patent No.: US 12,094,447 B2
(45) Date of Patent: Sep. 17, 2024

(54) NEURAL TEXT-TO-SPEECH SYNTHESIS WITH MULTI-LEVEL TEXT INFORMATION

(71) Applicant: Microsoft Technology Licensing, LLC, Redmond, WA (US)

(72) Inventors: Huaiping Ming, Redmond, WA (US); Lei He, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 17/293,404

(22) PCT Filed: Dec. 13, 2018

(86) PCT No.: PCT/CN2018/120984
§ 371 (c)(1),
(2) Date: May 12, 2021

(87) PCT Pub. No.: WO2020/118643
PCT Pub. Date: Jun. 18, 2020

(65) Prior Publication Data
US 2022/0020355 A1    Jan. 20, 2022

(51) Int. Cl.
*G10L 13/08*    (2013.01)
*G06F 40/20*    (2020.01)
(Continued)

(52) U.S. Cl.
CPC .............. *G10L 13/08* (2013.01); *G06F 40/20* (2020.01); *G06F 40/205* (2020.01);
(Continued)

(58) Field of Classification Search
None
See application file for complete search history.

(56) References Cited

U.S. PATENT DOCUMENTS 8,527,276 B1 *   9/2013   Senior ................. G06N 3/084
                                                 704/258
10,741,169 B1 *   8/2020   Trueba ................. G10L 13/02
(Continued)

FOREIGN PATENT DOCUMENTS

CN      105336322 A     2/2016
CN      107077638 A     8/2017
(Continued)

OTHER PUBLICATIONS

Sercan O. Arik ; Mike Chrzanowski; Adam Coates; Gregory Diamos; Andrew Gibiansky; Yongguo Kang; Xian Li; John Miller; Andrew Ng ;Jonathan Raiman ;Shubho Sengupta;Mohammad Shoeybi; Deep Voice: Real-time Neural Text-to-Speech (Year: 2017).*
(Continued)

*Primary Examiner* — Richa Sonifrank
(74) *Attorney, Agent, or Firm* — Schwegman Lundberg & Woessner, P.A.

(57) ABSTRACT

A method and apparatus for generating speech through neural text-to-speech (TTS) synthesis. A text input may be obtained (1310). Phoneme or character level text information may be generated based on the text input (1320). Context-sensitive text information may be generated based on the text input (1330). A text feature may be generated based on the phoneme or character level text information and the context-sensitive text information (1340). A speech waveform corresponding to the text input may be generated based at least on the text feature (1350).

11 Claims, 8 Drawing Sheets

(51) Int. Cl.
G06F 40/205 (2020.01)
G06F 40/253 (2020.01)
G06N 3/045 (2023.01)
G06N 20/20 (2019.01)
G10L 13/047 (2013.01)
G10L 13/06 (2013.01)
G10L 25/30 (2013.01)

(52) U.S. Cl.
CPC ........... G06F 40/253 (2020.01); G06N 3/045 (2023.01); G06N 20/20 (2019.01); G10L 13/047 (2013.01); G10L 13/06 (2013.01); G10L 25/30 (2013.01)

(56) References Cited

U.S. PATENT DOCUMENTS

| 2005/0071163 | A1 | 3/2005 | Aaron et al. | |
| 2006/0136216 | A1 | 6/2006 | Shen et al. | |
| 2018/0075343 | A1* | 3/2018 | van den Oord | G06N 3/084 |
| 2018/0330729 | A1* | 11/2018 | Golipour | G10L 15/26 |
| 2019/0129947 | A1* | 5/2019 | Shin | G06F 40/58 |
| 2019/0362703 | A1* | 11/2019 | Ijima | G06F 40/20 |

FOREIGN PATENT DOCUMENTS

| CN | 108170686 | A | * | 6/2018 | ............ | G06F 40/58 |
| EP | 1777697 | B1 | | 3/2013 | | |
| WO | 2005034083 | A1 | | 4/2005 | | |
| WO | 2015191651 | A1 | | 12/2015 | | |
| WO | 2018151125 | A1 | | 8/2018 | | |

OTHER PUBLICATIONS

Richard Socher John Bauer Christopher D. Manning Andrew Y. Ng; Parsing with Compositional Vector Grammars (Year: 2016).*
Minghui Dong, Zhengchen Zhang, and Huaiping Ming; Representing Raw Linguistic Information in Chinese Text-to-Speech System; URL: https://ieeexplore.ieee.org/stamp/stamp.jsp?tp=&arnumber=8282022&tag=1 (Year: 2017).*
Chen, et al., "A Fast and Accurate Dependency Parser using Neural Networks", In Proceedings of the Conference on Empirical Methods in Natural Language Processing, Oct. 25, 2014, pp. 740-750.
Chung, et al., "Semi-Supervised Training for Improving Data Efficiency in End-to-End Speech Synthesis", In Repository of arXiv:1808.10128v1, Aug. 30, 2018, 5 Pages.
Wang, et al., "Tacotron: Towards End-to-End Speech Synthesis", In Proceedings of 18th Annual Conference of the International Speech Communication Association, Aug. 20, 2017, pp. 4006-4010.
Devlin, et al., "BERT: Pre-training of Deep Bidirectional Transformers for Language Understanding", In Repository of arXiv:1810.04805v1, Oct. 11, 2018, 14 Pages.
Griffin, et al., "Signal Estimation from Modified Short-Time Fourier Transform", In Journal of IEEE Transactions on Acoustics, Speech, and Signal Processing, vol. 32, Issue 2, Apr. 1984, pp. 236-243.
Hassan, et al., "Achieving Human Parity on Automatic Chinese to English News Translation", In Repository of arXiv:1803.05567v1, Mar. 15, 2018, 25 Pages.
Ming, et al., "Feature Reinforcement with Word Embedding and Parsing Information in Neural TTS", In Repository of arXiv:1901.00707v1, Jan. 3, 2019, 5 Pages.
Oord, et al., "WaveNet: A Generative Model for Raw Audio", In Proceedings of the 9th ISCA Speech Synthesis Workshop, Sep. 13, 2016, pp. 125.
"International Search Report and Written Opinion Issued in PCT Application No. PCT/CN18/120984", Mailed Date: Sep. 11, 2019, 10 Pages.
Ping, et al., "ClariNet: Parallel Wave Generation in End-to-End Text-to-Speech", In Repository of arXiv:1807.07281v1, Jul. 19, 2018, 12 Pages.
Ping, et al., "Deep Voice 3: 2000-Speaker Neural Text-to-Speech", In Repository of arXiv:1710.07654v1, Oct. 20, 2017, 15 Pages.
Shen, et al., "Natural TTS Synthesis by Conditioning Wavenet on MEL Spectrogram Predictions", In Proceedings of International Conference on Acoustics, Speech and Signal Processing, Apr. 15, 2018, pp. 4779-4783.
Socher, et al., "Parsing with Compositional Vector Grammars", In Proceedings of the 51st Annual Meeting of the Association for Computational Linguistics, vol. 1: Long Papers, Aug. 4, 2013, pp. 455-465.
Sotelo, et al., "Char2Wav: End-to-End Speech Synthesis", In Proceedings of the 5th International Conference on Learning Representations, Apr. 24, 2017, 6 Pages.
Taigman, et al., "VoiceLoop: Voice Fitting and Synthesis via a Phonological Loop", In Repository of arXiv:1707.06588v3, Feb. 1, 2018, 14 Pages.
Wang, et al., "First Step Towards End-to-End Parametric TTS Synthesis: Generating Spectral Parameters with Neural Attention", In Proceedings of 17th Annual Conference of the International Speech Communication Association, Sep. 8, 2016, pp. 2243-2247.
"Extended European Search Report Issued in Application No. 18943236.2", Mailed Date: Jun. 28, 2022, 6 Pages.
Office Action Received for Chinese Application No. 201880091963.3, mailed on Apr. 30, 2024, 17 pages. (English Translation Provided).
"Office Action and Search Report Issued in Chinese Patent Application No. 201880091963.3", Mailed Date: Aug. 31, 2023, 16 Pages.

* cited by examiner

NEURAL TEXT-TO-SPEECH SYNTHESIS WITH MULTI-LEVEL TEXT INFORMATION

CROSS-REFERENCE TO RELATED APPLICATION

This application is a U.S. National Stage Filing under 35 U.S.C. 371 of International Patent Application Serial No. PCT/CN2018/120984, filed Dec. 13, 2018, and published as WO 2020/118643 A1 on Jun. 18, 2020, which application and publication are incorporated herein by reference in their entirety.

BACKGROUND

Text-to-speech (TTS) synthesis aims at generating a corresponding speech waveform based on a text input. The TTS synthesis is widely applied for, e.g., role playing in a fairytale, speech-to-speech translation, speech customization for certain users, etc. Neural TTS system is being more and more adopted for implementing TTS synthesis, and is tending to be one of the most popular directions in Artificial Intelligence (AI) field in recent years. Different from traditional TTS techniques which require front-end text linguistic feature extracting, the neural TTS system may be modeled in an end-to-end structure and may be trained directly based on text-speech data pairs. Therefore, the neural TTS system may alleviate the need for extensive domain expertise, and may also save many laborious works. The neural TTS system may jointly optimize pronunciation, prosody, etc. of speech, which results in more natural synthesized speech than the traditional TTS techniques.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for generating speech through neural TTS synthesis. A text input may be obtained. Phoneme or character level text information may be generated based on the text input. Context-sensitive text information may be generated based on the text input. A text feature may be generated based on the phoneme or character level text information and the context-sensitive text information. A speech waveform corresponding to the text input may be generated based at least on the text feature.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
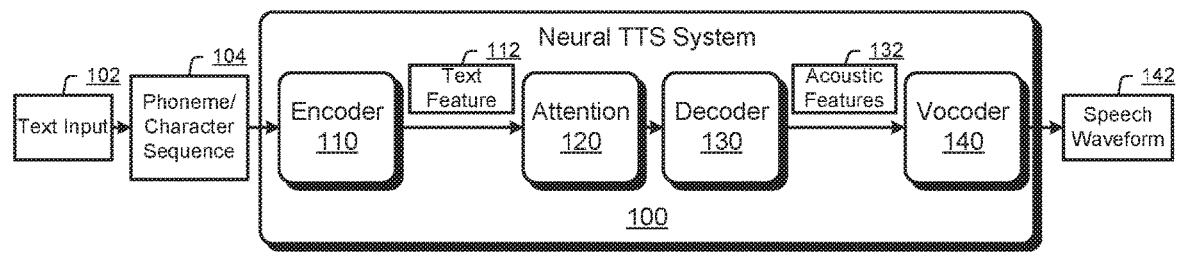
FIG. 1 illustrates an exemplary traditional neural TTS system.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

A traditional neural TTS system may generate a speech waveform based on a text input. Specifically, a phoneme sequence or a character sequence may be identified from the text input, and the phoneme or character sequence is further used by the neural TTS system for generating the speech waveform corresponding to the text input. The neural TTS system is highly dependent on training data due to its end-to-end model nature. The neural TTS system may be trained by text-speech data pairs in a training corpus. Herein, "corpus" may refer to a set of speeches with each speech being identified with a corresponding text, and thus a corpus may provide a plurality of text-speech data pairs. However, the amount of high quality text-speech data pairs in the training corpus is usually quite small, especially compared with the data size of nature language processing (NLP) tasks, e.g., machine translation. Moreover, the text in the training corpus is often distributed in very few domains, e.g., conversational text, reported news, etc. Therefore, the training data for the neural TTS system cannot cover rich enough text context, and it's common to encounter out-of-domain problems when deploying or applying the neural TTS system. Herein, "out-of-domain problem" refers to generalization problem caused by out-of-domain text, and "out-of-domain" text refers to a text which is not involved in the training corpus, or for which no relevant text is involved in the training corpus. The neural TTS system may have difficulties to cope with out of domain text, and the out-of-domain text usually results in various out-of-domain problems during generating speech, e.g., strange prosody, wrong pronunciation, skipping or repeating words, etc.

Moreover, it is known that the same text may correspond to various different pronunciations, e.g., different speeds, different pitch accents, different emotions, etc. From a mathematical point of view, conversion from text to speech can be viewed as a large-scale inverse problem, which decompresses a highly compressed source, e.g., text, into a very complex target, e.g., audio signals. There are many approaches for solving this type of ill-posed mathematical problem. The neural TTS system tries to solve this problem with machine learning techniques. From a machine learning point of view, the conversion from text to speech is a one-to-many mapping problem. The neural TTS system has to cope with large variations in a signal domain for a given text input. As a result of the one-to-many mapping nature and the small training corpus in restricted domains, it tends to cause a trained model in the neural TTS system to be a biased model. The biased model usually generates less expressive speech with fixed patterns, e.g., speech in a reading style with flat pitch accent, etc.

The traditional neural TTS system only utilizes phoneme level text information or character level text information for generating speech. The phoneme level text information refers to information representations of phonemes pronouncing the text input, and is generated based on a phoneme sequence identified from the text input, wherein the phoneme sequence is a list of sequential phonemes forming pronunciation of the text input. The character level text information refers to information representations of characters constituting the text input, and is generated based on a character sequence identified from the text input, wherein the character sequence is a list of sequential characters contained in the text input. Since the phoneme or character level text information lacks context related information contained in the text input, the traditional neural TTS system could not effectively solve the out-of-domain problem and the one-to-many mapping problem as discussed above.

Different from the traditional neural TTS system only utilizing the phoneme or character level text information, embodiments of the present disclosure propose to further utilize context-sensitive text information to improve generation ability of a neural TTS system. The context-sensitive text information refers to information representations of the text input that at least reflect or contain context relationship among words, phrases or sentences in the text input. The context-sensitive text information may comprise various types of text information capable of reflecting context relationship in the text input, including but not limited to, e.g., word level text information, sentence level text information, etc. The word level text information refers to information representations of both the words in the text input and context relationship implied among the words in the text input. The word level text information may be generated through performing pre-trained word embedding on the text input. For example, the pre-trained word embedding may be based on NLP techniques, e.g., neural machine translation (NMT). The sentence level text information refers to information representations of grammatical parsing of sentence in the text input. The sentence level text information may be generated based on grammatical structure of sentence in the text input, and various grammatical parsing techniques may be adopted for obtaining the grammatical structure, e.g., the Stanford Parser tool, which is a statistical parser using knowledge of language gained from hand-parsed sentences.

The word level text information and the sentence level text information may be viewed as additional features to the neural TTS system for achieving feature reinforcement in the neural TTS system. Thus, for the neural TTS system, the training of a model for generating the word level text information and a model for generating the sentence level text information are actually feature based pre-training. Through the feature based pre-training, the neural TTS system may borrow knowledge from the additional features generated by the models trained with large text data corpuses.

Both word embedding and grammatical parsing are context sensitive, and accordingly the word level text information and the sentence level text information are also context-sensitive features from language-related models. As compared with the text-speech training corpus for the traditional neural TTS system, those models for generating the word level text information and the sentence level text information are trained with very large text data corpuses, which means that the training is based on rich text context coverage. Such priori knowledge can help to solve the out-of-domain problem.

The number of words is much bigger than the number of phonemes or characters, and grammatical structure is various for different sentences. It is well known that speech prosody is largely dependent on words and sentence grammatical structure. The neural TTS system may learn common patterns of prosody, e.g., break, pitch accent, etc., from the priori knowledge contained in words and sentence grammatical structure. Therefore, with the word level text information and the sentence level text information, more information may help to relieve the one-to-many mapping problem and generate more natural and expressive speech.

As discussed above, the neural TTS system according to the embodiments of the present disclosure considers multi-level text information during generating speech, e.g., at least one of phoneme or character level text information, word level text information, sentence level text information, etc. This may enhance generalization ability of the neural TTS system, significantly improve system robustness for out-of-domain text, improve synthesized speech to high quality for out-of-domain text, etc.

FIG. 1 illustrates an exemplary traditional neural TTS system 100. The neural TTS system 100 may be configured for generating a speech waveform 142 corresponding to a text input 102. The text input 102 may be a sentence containing one or more words, one or more phrases, etc.

As shown in FIG. 1, a phoneme or character sequence 104 may be identified from the text input 102 through various existing techniques, e.g., Letter-to-Sound (LTS), etc., and then the phoneme or character sequence 104 may be provided to the neural TTS system 100 as input.

The neural TTS system 100 may comprise an encoder 110. The encoder 110 may be configured for generating a text feature 112 corresponding to the text input 102. The text feature 112 may be a representation of information contained in the text input 102 in a vector space, which may be designed for alignment with acoustic features in the vector space. The encoder 110 may comprise a phoneme or character embedding model which is used for converting the phoneme or character sequence 104 into a phoneme or character embedding vector sequence, wherein the phoneme or character embedding vector sequence may be viewed as phoneme or character level text information. The phoneme or character embedding vector sequence comprises a set of phoneme or character embedding vectors, each embedding vector corresponding to a phoneme or character in the phoneme or character sequence 104. The phoneme or character embedding model may randomly initialize the embedding vectors with zero means and unit variance Gaussian distribution, and may be jointly trained and updated with the neural TTS system 100.

It should be appreciated that, in other implementations, the phoneme or character embedding model may also be trained or updated independently from the neural TTS system 100. In this case, the phoneme or character embedding model may be outside of the encoder 110. For example, after the phoneme or character sequence 104 is identified from the text input 102, a phoneme or character embedding vector sequence may be generated through the phoneme or character embedding model, and then the phoneme or character embedding vector sequence may be provided to the encoder 110 as input. In other words, instead of directly taking the phoneme or character sequence as input, the encoder 110 may also alternatively take the phoneme or character level information as input.

In either the case that the encoder 110 generates the phoneme or character level information with the phoneme or character embedding model included in the encoder 110, or the case that the encoder 110 receives the phoneme or character level information directly, the encoder 110 may comprise a neural network for converting the phoneme or character level information into the text feature 112. The neural network may be based on various network structures, e.g., a network structure comprising a combination of one or more convolutional neural network (CNN) layers and one or more recurrent neural network (RNN) layers, a network structure comprising a combination of 1-D convolutional filters, highway networks and bi-directional RNN, and so on.

The neural TTS system 100 may comprise an attention unit 120. The attention unit 120 may implement an attention mechanism which acts as a bridge connecting the encoder 110 and a decoder 130. For example, the attention mechanism may facilitate to make alignment between a text feature output by the encoder 112 and acoustic features to be generated by the decoder 130. Various types of attention mechanism may be implemented by the attention unit 120, e.g., soft attention, hard attention, location sensitive attention, Gaussian Mixture Model (GMM) attention, etc.

The decoder 130 may map the text feature output by the encoder 110 to acoustic features 132 under impacts by the attention mechanism in the attention unit 120. The acoustic features 132 may comprise various traditional TTS acoustic features, e.g., mel-spectrum, linear spectrum pairs (LSP), etc. The decoder 130 may be based on various network structures, e.g., a network structure comprising a combination of feed-forward layers, Long Short Term Memory (LSTM) layers and CNN layers, and so on.

The neural TTS system 100 may comprise a vocoder 140. The vocoder 140 may generate the speech waveform 142 based on the acoustic features 132 output by the decoder 130. The vocoder 140 may be based on various network structures, e.g., a network structure established with a neural generative model, and so on. For example, the vocoder 140 may be the WaveNet vocoder.

Figure 2:
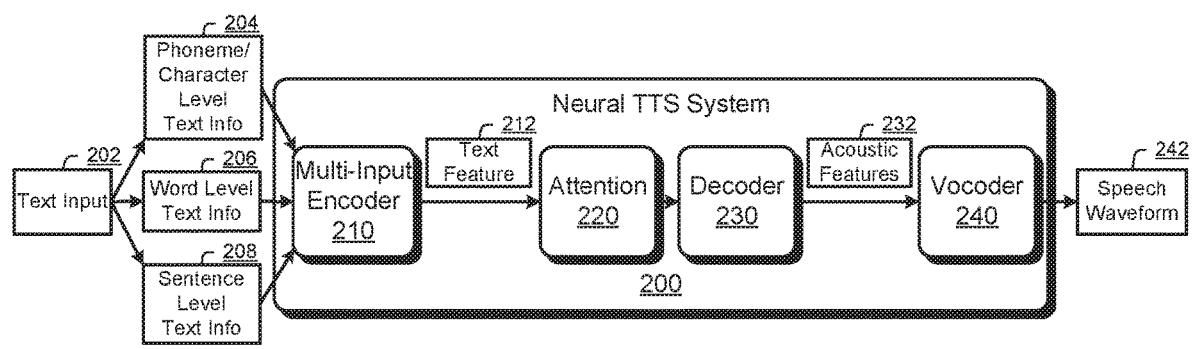
FIG. 2 illustrates an exemplary architecture of a neural TTS system according to an embodiment.

FIG. 2 illustrates an exemplary architecture of a neural TTS system 200 according to an embodiment. It should be appreciated that the architecture shown in FIG. 2 is only a diagram for the sake of explaining some concepts or aspects of the present disclosure, and the neural TTS system 200 may actually have various implementation approaches.

The neural TTS system 200 may comprise a multi-input encoder 210, an attention unit 220, a decoder 230, and a vocoder 240. Except for replacing the encoder 110 in FIG. 1 by the multi-input encoder 210, the neural TTS system 200 may have similar architecture with the neural TTS system 100. For example, the attention unit 220, the decoder 230 and the vocoder 240 may be the same as or similar with the attention unit 120, the decoder 130 and the vocoder 140 in the neural TTS system 100 in FIG. 1.

As shown in FIG. 2, after obtaining a text input 202, multi-level text information may be generated based on the text input 202. For example, the multi-level text information may comprise phoneme or character level text information 204 and at least one type of context-sensitive text information, e.g., word level text information 206 and/or sentence level text information 208.

The phoneme or character level text information 204 may be the same as the phoneme or character level text information discussed above in connection with FIG. 1. Similar with the cases as discussed above, the phoneme or character level text information 204 may be either generated by a phoneme or character embedding model inside the multi-input encoder 210 based on a phoneme or character sequence identified from the text input 202, or be generated by a phoneme or character embedding model outside the multi-input encoder 210. Accordingly, although it is shown in FIG. 2 that the phoneme or character level text information 204 is provided to the multi-input encoder 210 as input, a phoneme or character sequence identified from the text input 202 may be provided to the multi-input encoder 210 as input instead. The embodiments of the present invention would cover both of these two cases. It should be appreciated that although the following discussions take the case of providing the phoneme or character sequence directly to the multi-input encoder as input as an example, similar inventive concepts may also be applied to the case of providing the phoneme or character embedding vector sequence to the multi-input encoder as input except that the phoneme or character embedding model for generating the phoneme or character embedding vector sequence locates outside of the multi-input encoder.

The word level text information 206 may be obtained through performing word embedding on the text input 202. The sentence level text information 208 may be obtained through performing grammatical parsing on the text input 202.

The multi-input encoder 210 may generate a text feature 212 corresponding to the text input 202 based on the multi-level text information, e.g., at least one of the phoneme or character level text information 204, the word level text information 206 and the sentence level text information 208. In other words, the multi-input encoder 210 may combine or mix the phoneme or character level text information 204, the word level text information 206 and the sentence level text information 208 so as to generate the text feature 212.

The text feature 212 may be provided to the attention unit 220 which implements an attention mechanism. The attention mechanism may utilize the text feature 212 to impact operations of the decoder 230. The decoder 230 may map the text feature output by the encoder 210 to acoustic features 232 under impacts by the attention mechanism in the attention unit 220. The vocoder 240 may generate the speech waveform 242 based on the acoustic features 232 output by the decoder 230.

Since the neural TTS system 200 considers multi-level text information during generating speech, especially, utilizing context-sensitive text information, e.g., the word level text information 206 and/or the sentence level text information 208 for speech generation, the neural TTS system 200 may have a much better generalization ability than any traditional neural TTS system, and may effectively generate high quality synthesized speech for out-of-domain text.

It should be appreciated that depending on different combinations of the multi-level text information, several systems may be derived from the neural TTS system 200, e.g., a neural TTS system based on both phoneme or character level text information and word level text information, a neural TTS system based on both phoneme or character level text information and sentence level text information, a neural TTS system based on phoneme or character level text information, word level text information and sentence level text information, etc.

Figure 3:
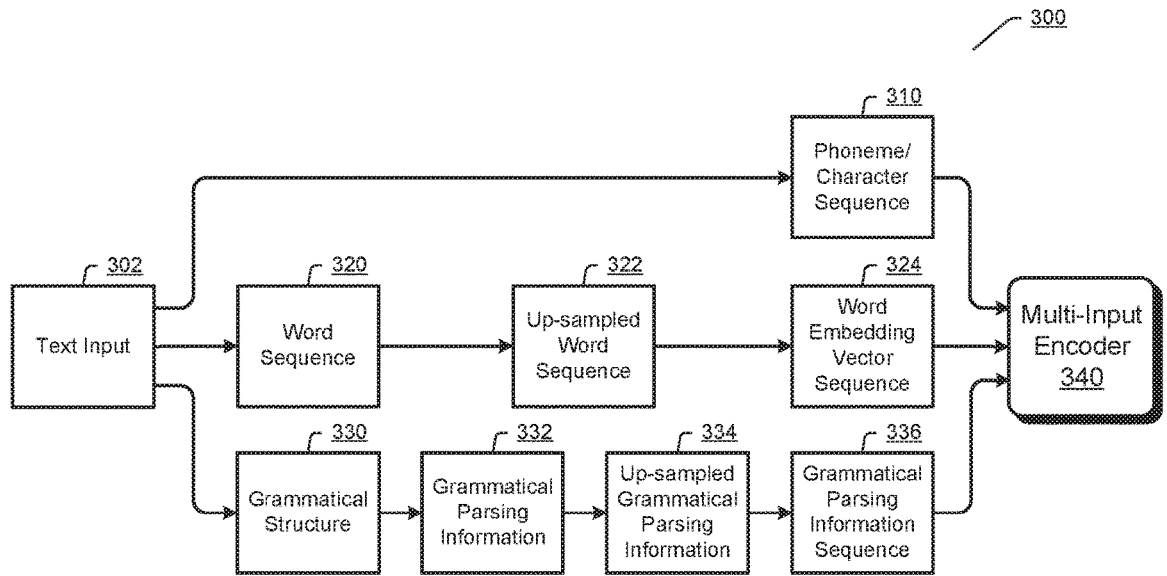
FIG. 3 illustrates an exemplary process for providing multi-level text information to a multi-input encoder according to an embodiment.

FIG. 3 illustrates an exemplary process 300 for providing multi-level text information to a multi-input encoder in a neural TTS system according to an embodiment.

It is assumed that the neural TTS system is to generate speech corresponding to a text input 302. FIG. 3 shows how to provide multi-level text information input to a multi-input encoder 340 in the neural TTS system.

In an aspect, a phoneme or character sequence 310 may be identified from the text input 302. The phoneme sequence is a list of sequential phonemes forming pronunciation of the text input 302, and the character sequence is a list of sequential characters contained in the text input 302. The phoneme or character sequence 310 may be provided to the multi-input encoder 340.

In another aspect, a word sequence 320 may be identified from the text input 302. The word sequence 320 is a list of sequential words constituting the text input 302. Then, optionally, the word sequence 320 may be up-sampled to align with the phone or character sequence 310. For example, a word may be pronounced with one or more phonemes, and thus, during the up-sampling, each word in the word sequence may be repeated multiple times corresponding to its number of phonemes. Similarly, a word may comprise one or more characters, and thus, during the up-sampling, each word in the word sequence may be repeated multiple times corresponding to its number of characters. After the up-sampling, an up-sampled word sequence 322 may be obtained. A pre-trained word embedding model may be used for generating a word embedding vector sequence 324 based on the up-sampled word sequence 322, wherein each word has a corresponding embedding vector, and all these embedding vectors form the word embedding vector sequence 324. The word embedding model may be based on neural machine translation (NMT), and thus it is a sequence-to-sequence encoder-decoder model with an attention mechanism. Since both the word embedding model and the neural TTS system are in a similar sequence-to-sequence encoder-decoder framework, this would benefit to network convergence. The word embedding vectors contain the meaning of the words and semantic context information, which would help to solve the out-of-domain problem and to enrich prosody of generated speech. The word embedding vector sequence 324 may be provided to the multi-input encoder 340 as word level text information. It should be appreciated that the up-sampling of the word sequence 320 is optional, and thus the word embedding vector sequence 324 may also be generated by the word embedding model based on the word sequence 320 directly.

Figure 4:
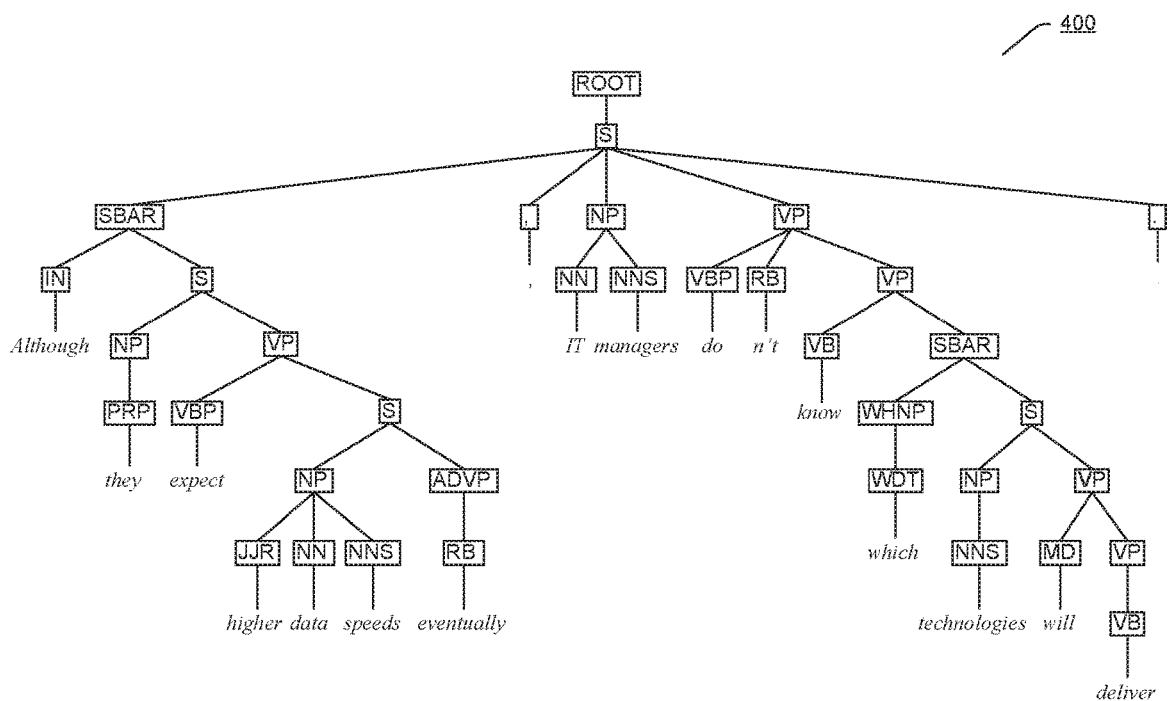
FIG. 4 illustrates an exemplary grammatical structure of a sentence according to an embodiment.

In another aspect, a grammatical structure 330 of a sentence in the text input 302 may be obtained through performing grammatical parsing on the text input 302. The grammatical structure 330 may be further used for generating sentence level text information. The grammatical parsing may be performed through various existing grammatical parsing techniques, e.g., the Stanford Parser tool. FIG. 4 illustrates an exemplary grammatical structure 400 of an English sentence according to an embodiment. The exemplary sentence may be "Although they expect higher data speeds eventually, IT managers don't know which technologies will deliver." As shown in FIG. 4, the sentence is parsed into a tree-form grammatical structure. It should be appreciated that the grammatical structure 400 in FIG. 4 is only an example of the grammatical structure 330 in FIG. 3, and the grammatical structure of the sentence may also be parsed into any other forms.

Then, grammatical parsing information 332 may be extracted from the grammatical structure 330 for each word in the text input 302. The grammatical parsing information 332 of each word may comprise at least one of: an indication of phrase type of at least one phrase containing the word; an indication of whether the word is a border of the at least one phrase; and an indication of relative position of the word in the at least one phrase.

Regarding the indication of phrase type, taking the Stanford Parser tool as an example, there may be 67 phrase types, and a corresponding phrase type table may include: 'DT', 'NP', 'S', 'VBZ', 'VP', 'NN', ',', 'CC', 'PRP', 'VBG', '.', 'VBP', 'VBD', 'NNP', 'NNS', 'VB', 'IN', 'PP', 'JJ', 'X', 'SBAR', 'JJR', 'CD', 'ADJP', 'TO', 'RB', 'ADVP', 'PRP$', 'MD', 'NNPS', 'VBN', 'RBR', 'WRB', 'FRAG', 'JJS', 'WDT', 'WHNP', 'UH', 'NAC', 'INTJ', 'RP', 'PRT', 'POS', 'QP', 'SINV', 'EX', 'PRN', 'WP', 'RBS', 'WHADVP', 'PDT', ':', 'CONJP', 'WHPP', 'UCP', 'FW', 'RRC', 'NX', '""', 'WP$', 'SBARQ', 'SQ', 'LS', 'WHADJP', '$', 'SYM', 'LST', etc. It should be appreciated that as for other grammatical parsing techniques, there may be any other numbers of phrase type and any other classifications of phrase type.

Continue with the above example, a 67 dimension one-hot vector may be used for representing phrase type of a word. For example, as shown in FIG. 4, the word "Although" has the phrase type of 'IN', which is the $17^{th}$ type in the phrase type table. Thus, a phrase type vector, as an indication of the phrase type, may be created for the word "Although", in which the $17^{th}$ dimension is annotated as 1.0 while other dimensions are annotated as 0.0, such as, ['0.0', '0.0', '0.0', '0.0', '0.0', '0.0', '0.0', '0.0', '0.0', '0.0', '0.0', '0.0', '0.0', '0.0', '0.0', '0.0', '1.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0', '0.0'].

Regarding the indication of whether the word is a phrase border, it is used for indicating whether the current word is a border or in the boundary of a current phrase or not. A one dimension one-hot vector may be created for indicating whether a word is a phrase border. For example, the word "Although" is on the beginning of a phrase "Although they expect higher data speeds eventually", i.e., it is the border of the phrase, thus a corresponding phrase border vector may be created with an annotation '1'. For example, the word "data" is neither on the beginning nor on the ending of a phrase "higher data speeds", i.e., it is not the border of the phrase, thus a corresponding phrase border vector may be created with an annotation '0'.

Regarding the indication of relative position of the word in the current phrase, the relative position p is computed as p=ind/len, wherein ind is the index and len is the number of nodes in the current phrase. Taking the word "Although" as an example, if the whole sentence is considered as the current phrase, as shown in FIG. 4, there are 18 nodes in the tree, and this word is the 1$^{st}$ word, i.e., the index is '1', thus the relative position of this word in the current phrase is 1/18=0.055555. Taking the word "they" as an example, if the whole sentence is considered as the current phrase, there are 18 nodes in the tree, and this word is the 2$^{nd}$ word, i.e., the index is '2', thus the relative position of this word in the current phrase is 2/18=0.11111111. While if considering "Although they expect higher data speeds eventually" as the current phrase, there are 7 nodes in the tree, and the word "they" is the 2$^{nd}$ word, i.e., the index is '2', thus the relative position of this word in the current phrase is 2/7=0.28571429.

For different sentences, the depth of the grammatical parsing tree may be different. Not all the nodes in the grammatical parsing tree contain important information for TTS synthesis prosody. Usually, those nodes closer to the root node contain more information. Thus, in some implementations, only information of the top several layers may be extracted to be used by the neural TTS system. The following Table 1 gives an example of extracting grammatical parsing information of the top 5 layers. For each word, features, e.g., grammatical parsing information, are extracted from root phrase to leave phrases, and these features are concatenated from root to leaves. Table 1 only exemplarily shows grammatical parsing information of the first three words extracted from the grammatical structure in FIG. 4.

TABLE 1

| Word | Phrase type | Phrase border | Relative position of word in current phrase |
|---|---|---|---|
| Although | ['S', 'SBAR', 'IN', 'IN', 'IN'] | ['1', '1', '1', '1', '1'] | len [18, 7, 1, 1, 1] ind [1, 1, 1, 1, 1] p = ind/len |
| they | ['S', 'SBAR', 'S', 'NP', 'PRP'] | ['0', '0', '1', '1', '1'] | len [18, 7, 6, 1, 1] ind [2, 2, 1, 1, 1] p = ind/len |
| expect | ['S', 'SBAR', 'S', 'VP', 'VBP'] | ['0', '0', '0', '1', '1'] | len [18, 7, 6, 5, 1] ind [2, 2, 1, 1, 1] p = ind/len |

Taking the word "expect" as an example. The first considered phrase containing this word is the whole sentence, the phrase type is 'S', this word is not a border of the current phrase and thus annotated as '0' in the phrase border vector, the phrase length is 18 and this word is the 2$^{nd}$ word and thus the relative position of this word in the current phrase is 2/18. The second considered phrase containing this word is "Although they expect higher data speeds eventually", the phrase type is 'SBAR', this word is not a border of the current phrase and thus annotated as '0' in the phrase border vector, the phrase length is 7 and this word is the 2$^{nd}$ word and thus the relative position of this word in the current phrase is 2/7. The third considered phrase containing this word is "they expect higher data speeds eventually", the phrase type is 'S', this word is not a border of the current phrase and thus annotated as '0' in the phrase border vector, the phrase length is 6 and this word is the 2$^{nd}$ word and thus the relative position of this word in the current phrase is 2/6. The fourth considered phrase containing this word is "expect higher data speeds eventually", the phrase type is 'VP', this word is a border of the current phrase and thus annotated as '1' in the phrase border vector, the phrase length is 5 and this word is the 1$^{st}$ word and thus the relative position of this word in the current phrase is 1/5. The fifth considered phrase containing this word is "expect", the phrase type is 'VBP', this word is a border of the current phrase and thus annotated as '1' in the phrase border vector, the phrase length is 1 and this word is the 1$^{st}$ word and thus the relative position of this word in the current phrase is 1/1.

The above grammatical parsing information extracted for the word "expect" in the top 5 layers may be concatenated together. For example, as shown in Table 1, the phrase types in the 5 layers may be concatenated as ['S', 'SBAR', 'S', 'VP', 'VBP']. The phrase border vectors in the 5 layers may be concatenated as ['0', '0', '0', '1', '1']. The phrase lengths in the 5 layers may be concatenated as len [18, 7, 6, 5, 1] and the index in the 5 layers may be concatenated as ind [2, 2, 2, 1, 1], and thus the relative positions in the 5 layers may also be concatenated as p=ind/len=[2/18, 2/7, 2/6, 1/5, 1/1].

It should be appreciated that although Table 1 shows all the three types of grammatical parsing information are extracted for each word, the grammatical parsing information 332 in FIG. 3 may only comprise any one or two of the three types of grammatical parsing information.

As discussed above, the grammatical parsing information 332 is extracted on a word basis, thus, optionally, the grammatical parsing information 332 of each word may be up-sampled to align with the phone or character sequence 310. For example, during the up-sampling, grammatical parsing information of each word may be repeated multiple times corresponding to the number of phonemes or characters in the word. After the up-sampling, up-sampled grammatical parsing information 334 of each word may be obtained. Then, up-sampled grammatical parsing information of all the words in the text input may be combined together to form a grammatical parsing information sequence 336. The grammatical parsing information sequence 336 may be provided to the multi-input encoder 340 as sentence level text information. The sentence level text information contains context-sensitive information obtained from the grammatical parsing on the text input, which would help to solve the out-of-domain problem and to improve the prosody performance of generated speech. It should be appreciated that the up-sampling of the grammatical parsing information 332 is optional, and thus the grammatical parsing information sequence 336 may also be formed by the grammatical parsing information 332 directly.

Figure 5:
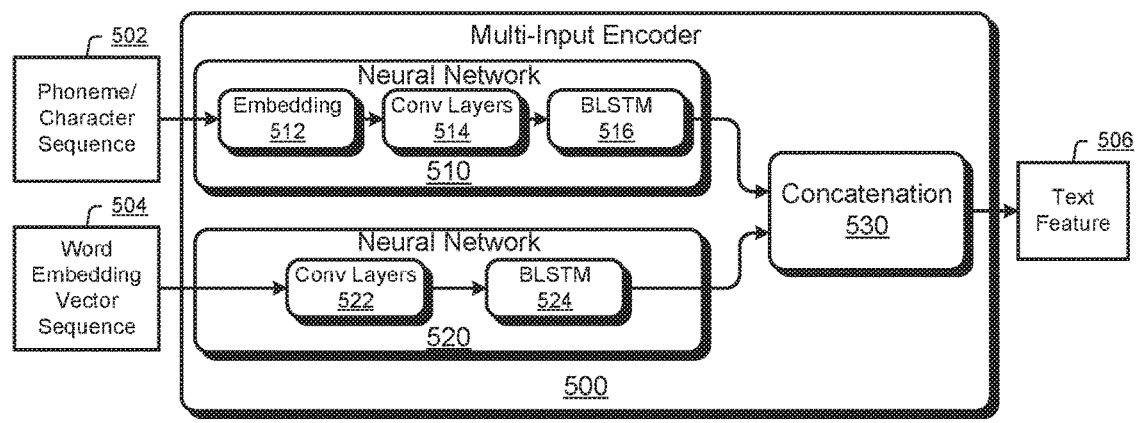
FIG. 5 illustrates an exemplary implementation of a multi-input encoder according to an embodiment.

FIG. 5 illustrates an exemplary implementation of a multi-input encoder 500 according to an embodiment. The multi-input encoder 500 may be in a neural TTS system which generates speech based on both phoneme or character level text information and word level text information. In other words, the multi-input encoder 500 may be configured for generating a text feature based on phoneme or character level text information and word level text information, and the text feature is further used for generating speech. The multi-input encoder 500 may firstly generate a respective text feature for each of the phoneme or character level text information and the word level text information, and then combine the respective text features to form the text feature to be output by the multi-input encoder 500.

As shown in FIG. 5, a phoneme or character sequence 502 may be provided to the multi-input encoder 500, wherein the phoneme or character sequence 502 may correspond to the phoneme or character sequence 310 in FIG. 3. The multi-input encoder 500 may comprise a neural network 510 which is configured for generating a first text feature based on the phoneme or character sequence 502. The neural network 510 may be based on various network structures. As an example, the neural network 510 may comprise a phoneme or character embedding unit 512, one or more convolutional layers 514 and at least one bi-directional LSTM (BLSTM) layer 516. The phoneme or character embedding unit 512 may utilize a phoneme or character embedding model to convert the phoneme or character sequence 502 into a phoneme or character embedding vector sequence which is phoneme or character level text information. The phoneme or character embedding model may be randomly initialized or updated, e.g., established with random initialization settings for phones or characters or updated with random settings for phones or characters, and then jointly trained with the other parts of the multi-input encoder 500. The combination of the convolutional layers 514 and the BLSTM layer 516 may generate the first text feature based on the phoneme or character embedding vector sequence.

A word embedding vector sequence 504 may be provided to the multi-input encoder 500, wherein the word embedding vector sequence 504 may correspond to the word embedding vector sequence 324 in FIG. 3. The multi-input encoder 500 may comprise a neural network 520 which is configured for generating a second text feature based on the word embedding vector sequence 504. The neural network 520 may be based on various network structures. As an example, the neural network 520 may comprise one or more convolutional layers 522 and at least one BLSTM layer 524. The combination of the convolutional layers 522 and the BLSTM layer 524 may generate the second text feature based on the word embedding vector sequence 504.

The multi-input encoder 500 may further comprise a concatenation unit 530 for combining the first text feature output by the neural network 510 and the second text feature output by the neural network 520 into a text feature 506. For example, the first text feature and the second text feature may be concatenated together in terms of dimensions.

Figure 6:
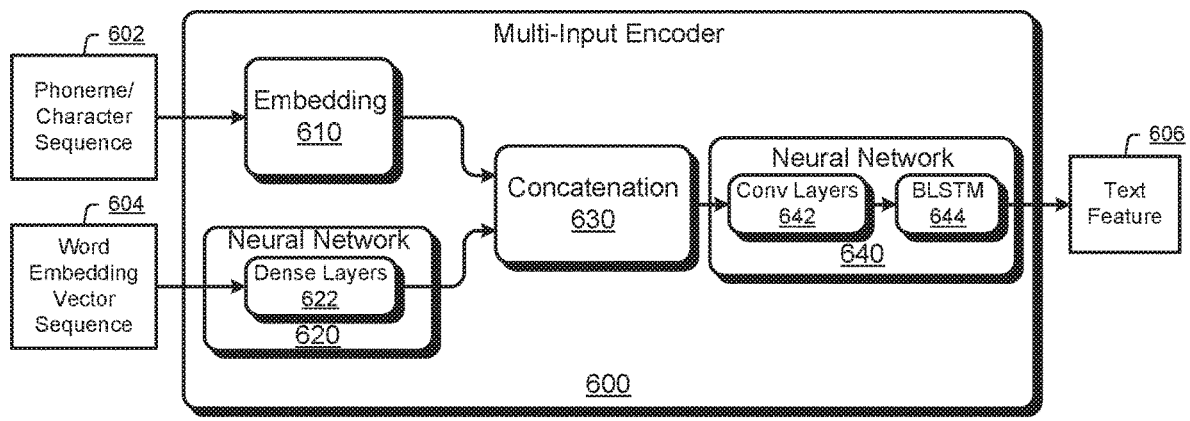
FIG. 6 illustrates an exemplary implementation of a multi-input encoder according to an embodiment.

FIG. 6 illustrates an exemplary implementation of a multi-input encoder 600 according to an embodiment. The multi-input encoder 600 may be in a neural TTS system which generates speech based on both phoneme or character level text information and word level text information. In other words, the multi-input encoder 600 may be configured for generating a text feature based on phoneme or character level text information and word level text information, and the text feature is further used for generating speech. The multi-input encoder 600 may firstly combine the phoneme or character level text information and the word level text information to form mixed text information, and then utilize the mixed text information to generate a text feature to be output by the multi-input encoder 600.

A phoneme or character sequence 602 may be provided to the multi-input encoder 600, wherein the phoneme or character sequence 602 may correspond to the phoneme or character sequence 310 in FIG. 3. The multi-input encoder 600 may comprise a phoneme or character embedding unit 610 which utilizes a phoneme or character embedding model to convert the phoneme or character sequence 602 into a phoneme or character embedding vector sequence as phoneme or character level text information. The phoneme or character embedding unit 610 may correspond to the phoneme or character embedding unit 512 in FIG. 5.

A word embedding vector sequence 604 may be provided to the multi-input encoder 600, wherein the word embedding vector sequence 604 may correspond to the word embedding vector sequence 324 in FIG. 3. The multi-input encoder 600 may comprise a neural network 620 which is configured for generating a compressed representation of the word embedding vector sequence 604. The neural network 620 may be based on various network structures. As an example, the neural network 620 may comprise one or more dense layers 622, e.g., feed-forward dense layers. Through the neural network 620, a compressed representation of the word embedding vector sequence 604 may be obtained.

The multi-input encoder 600 may further comprise a concatenation unit 630 for combining the phoneme or character embedding vector sequence and the compressed representation of the word embedding vector sequence 604 into mixed text information. For example, the phoneme or character embedding vector sequence and the compressed representation of the word embedding vector sequence may be concatenated together in terms of dimensions.

The multi-input encoder 600 may further comprise a neural network 640 which is configured for generating a text feature 606 based on the mixed text information. The neural network 640 may be based on various network structures. As an example, the neural network 640 may comprise one or more convolutional layers 642 and at least one BLSTM layer 644. The combination of the convolutional layers 642 and the BLSTM layer 644 may generate the text feature 606 based on the mixed text information.

Figure 7:
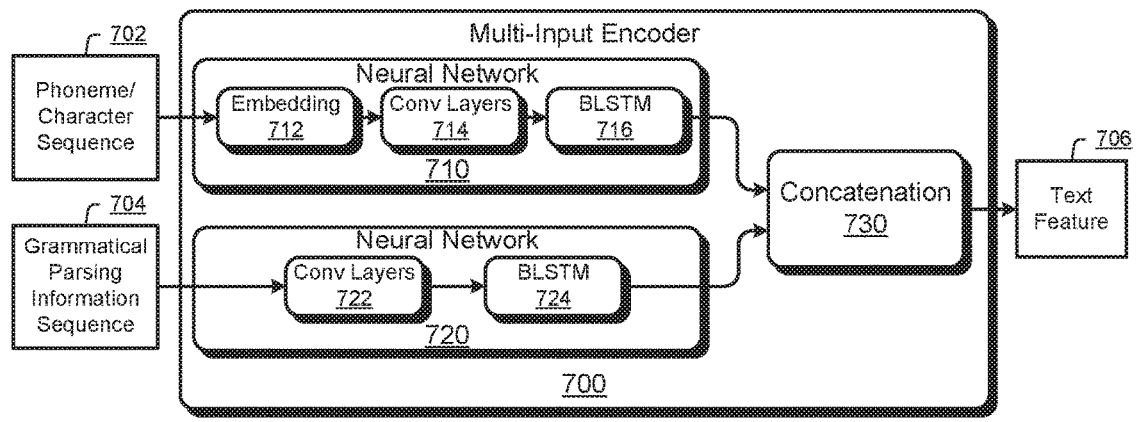
FIG. 7 illustrates an exemplary implementation of a multi-input encoder according to an embodiment.

FIG. 7 illustrates an exemplary implementation of a multi-input encoder 700 according to an embodiment. The multi-input encoder 700 may be in a neural TTS system which generates speech based on both phoneme or character level text information and sentence level text information. In other words, the multi-input encoder 700 may be configured for generating a text feature based on phoneme or character level text information and sentence level text information, and the text feature is further used for generating speech. The multi-input encoder 700 may firstly generate a respective text feature for each of the phoneme or character level text information and the sentence level text information, and then combine the respective text features to form the text feature to be output by the multi-input encoder 700. It should be appreciated that the architecture of the multi-input encoder 700 is similar with that of the multi-input encoder 500 except that the word level text information, e.g., the input word embedding vector sequence 504, is replaced by the sentence level text information, e.g., a grammatical parsing information sequence.

A phoneme or character sequence 702 may be provided to the multi-input encoder 700, wherein the phoneme or character sequence 702 may correspond to the phoneme or character sequence 310 in FIG. 3. The multi-input encoder 700 may comprise a neural network 710 which is configured for generating a first text feature based on the phoneme or character sequence 702. The neural network 710 is similar with the neural network 510 in FIG. 5. As an example, the neural network 710 may comprise a phoneme or character embedding unit 712, one or more convolutional layers 714 and at least one BLSTM layer 716, which may correspond to the phoneme or character embedding unit 512, the convolutional layers 514 and the BLSTM layer 516 in FIG. 5 respectively.

A grammatical parsing information sequence 704 may be provided to the multi-input encoder 700, wherein the grammatical parsing information sequence 704 may correspond to the grammatical parsing information sequence 336 in FIG. 3. The multi-input encoder 700 may comprise a neural network 720 which is configured for generating a second text feature based on the grammatical parsing information 704. The neural network 720 may be based on various network structures. As an example, the neural network 720 may comprise one or more convolutional layers 722 and at least one BLSTM layer 724. The combination of the convolutional layers 722 and the BLSTM layer 724 may generate the second text feature based on the grammatical parsing information sequence 704.

The multi-input encoder 700 may further comprise a concatenation unit 730 for combining the first text feature output by the neural network 710 and the second text feature output by the neural network 720 into a text feature 706. For example, the first text feature and the second text feature may be concatenated together in terms of dimensions.

Figure 8:
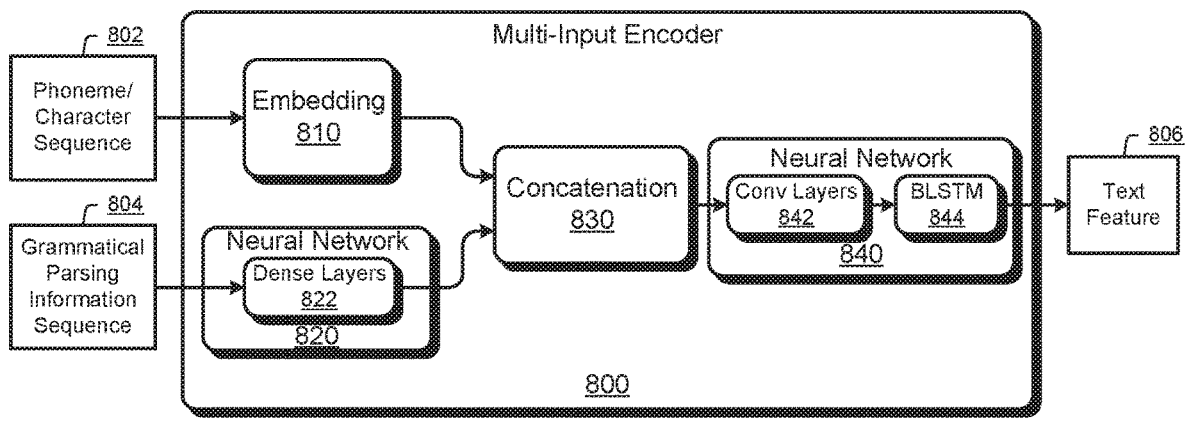
FIG. 8 illustrates an exemplary implementation of a multi-input encoder according to an embodiment.

FIG. 8 illustrates an exemplary implementation of a multi-input encoder 800 according to an embodiment. The multi-input encoder 800 may be in a neural TTS system which generates speech based on both phoneme or character level text information and sentence level text information. In other words, the multi-input encoder 800 may be configured for generating a text feature based on phoneme or character level text information and sentence level text information, and the text feature is further used for generating speech. The multi-input encoder 800 may firstly combine the phoneme or character level text information and the sentence level text information to form mixed text information, and then utilize the mixed text information to generate a text feature to be output by the multi-input encoder 800. It should be appreciated that the architecture of the multi-input encoder 800 is similar with that of the multi-input encoder 600 except that the word level text information, e.g., the input word embedding vector sequence 604, is replaced by the sentence level text information, e.g., a grammatical parsing information sequence.

A phoneme or character sequence 802 may be provided to the multi-input encoder 800, wherein the phoneme or character sequence 802 may correspond to the phoneme or character sequence 310 in FIG. 3. The multi-input encoder 800 may comprise a phoneme or character embedding unit 810 which utilizes a phoneme or character embedding model to convert the phoneme or character sequence 802 into a phoneme or character embedding vector sequence as phoneme or character level text information. The phoneme or character embedding unit 810 may correspond to the phoneme or character embedding unit 512 in FIG. 5.

A grammatical parsing information sequence 804 may be provided to the multi-input encoder 800, wherein the grammatical parsing information sequence 804 may correspond to the grammatical parsing information sequence 336 in FIG. 3. The multi-input encoder 800 may comprise a neural network 820 which is configured for generating a compressed representation of the grammatical parsing information sequence 804. The neural network 820 may be based on various network structures. As an example, the neural network 820 may comprise one or more dense layers 822, e.g., feed-forward dense layers. Through the neural network 820, a compressed representation of the grammatical parsing information sequence 804 may be obtained.

The multi-input encoder 800 may further comprise a concatenation unit 830 for combining the phoneme or character embedding vector sequence and the compressed representation of the grammatical parsing information sequence 804 into mixed text information. For example, the phoneme or character embedding vector sequence and the compressed representation of the grammatical parsing information sequence may be concatenated together in terms of dimensions.

The multi-input encoder 800 may further comprise a neural network 840 which is configured for generating a text feature 806 based on the mixed text information. The neural network 840 may be based on various network structures. As an example, the neural network 840 may comprise one or more convolutional layers 842 and at least one BLSTM layer 844. The combination of the convolutional layers 842 and the BLSTM layer 844 may generate the text feature 806 based on the mixed text information.

Figure 9:
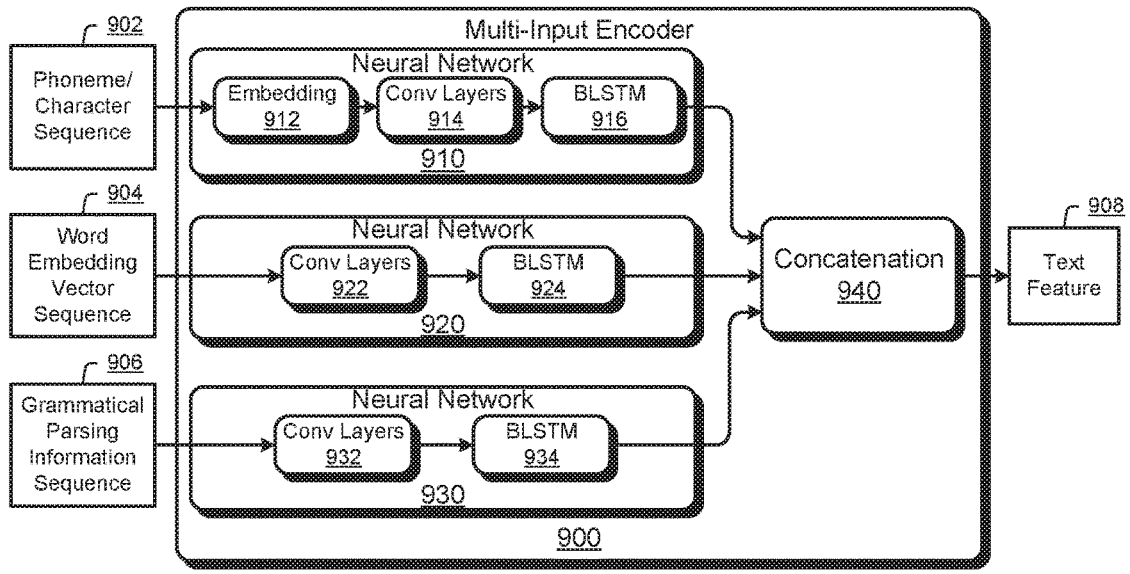
FIG. 9 illustrates an exemplary implementation of a multi-input encoder according to an embodiment.

FIG. 9 illustrates an exemplary implementation of a multi-input encoder 900 according to an embodiment. The multi-input encoder 900 may be in a neural TTS system which generates speech based on phoneme or character level text information, word level text information and sentence level text information. In other words, the multi-input encoder 900 may be configured for generating a text feature based on phoneme or character level text information, word level text information and sentence level text information, and the text feature is further used for generating speech. The multi-input encoder 900 may firstly generate a respective text feature for each of the phoneme or character level text information, the word level text information and the sentence level text information, and then combine the respective text features to form the text feature to be output by the multi-input encoder 900. The architecture of the multi-input encoder 900 may be viewed as a combination of the multi-input encoder 500 in FIG. 5 and the multi-input encoder 700 in FIG. 7.

The multi-input encoder 900 may comprise a neural network 910 for generating a first text feature based on a phoneme or character sequence 902. The neural network 902 is similar with the neural network 510 in FIG. 5 and the neural network 710 in FIG. 7. For example, the neural network 910 may comprise a phoneme or character embedding unit 912, one or more convolutional layers 914 and at least one BLSTM layer 916, which may correspond to the phoneme or character embedding unit 512 or 712, the convolutional layers 514 or 714, and the BLSTM layer 516 or 716, respectively.

The multi-input encoder 900 may comprise a neural network 920 for generating a second text feature based on a word embedding vector sequence 904. The neural network 920 is similar with the neural network 520 in FIG. 5. For example, the neural network 920 may comprise one or more convolutional layers 922 and at least one BLSTM layer 924, which may correspond to the convolutional layers 522 and the BLSTM layer 524 respectively.

The multi-input encoder 900 may comprise a neural network 930 for generating a third text feature based on a grammatical parsing information sequence 906. The neural network 930 is similar with the neural network 720 in FIG. 7. For example, the neural network 930 may comprise one or more convolutional layers 932 and at least one BLSTM layer 934, which may correspond to the convolutional layers 722 and the BLSTM layer 724 respectively.

The multi-input encoder 900 may further comprise a concatenation unit 940 for combining the first text feature output by the neural network 910, the second text feature output by the neural network 920 and the third text feature output by the neural network 930 into a text feature 908. For example, the first text feature, the second text feature and the third text feature may be concatenated together in terms of dimensions.

Figure 10:
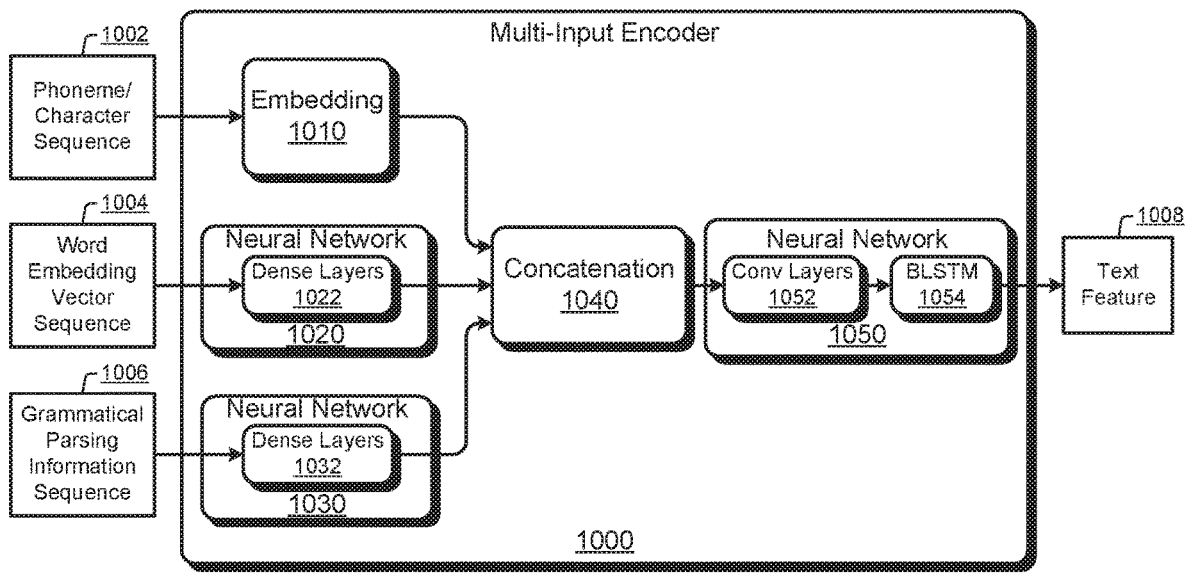
FIG. 10 illustrates an exemplary implementation of a multi-input encoder according to an embodiment.

FIG. 10 illustrates an exemplary implementation of a multi-input encoder 1000 according to an embodiment. The multi-input encoder 1000 may be in a neural TTS system which generates speech based on phoneme or character level text information, word level text information and sentence level text information. In other words, the multi-input encoder 1000 may be configured for generating a text feature based on phoneme or character level text information, word level text information and sentence level text information, and the text feature is further used for generating speech. The multi-input encoder 1000 may firstly combine the phoneme or character level text information, the word level text information and the sentence level text information to form mixed text information, and then utilize the mixed text information to generate a text feature to be output by the multi-input encoder 1000. The architecture of the multi-input encoder 1000 may be viewed as a combination of the multi-input encoder 600 in FIG. 6 and the multi-input encoder 800 in FIG. 8.

The multi-input encoder 1000 may comprise a phoneme or character embedding unit 1010 which utilizes a phoneme or character embedding model to convert a phoneme or character sequence 1002 into a phoneme or character embedding vector sequence as phoneme or character level text information. The embedding unit 1010 may correspond to the embedding unit 610 in FIG. 6 and the embedding unit 810 in FIG. 8.

The multi-input encoder 1000 may comprise a neural network 1020 which is configured for generating a compressed representation of a word embedding vector sequence 1004. The neural network 1020 is similar with the neural network 620 in FIG. 6. For example, the neural network 1020 may comprise one or more dense layers 1022, which may correspond to the dense layers 622.

The multi-input encoder 1000 may comprise a neural network 1030 which is configured for generating a compressed representation of a grammatical parsing information sequence 1006. The neural network 1030 is similar with the neural network 820 in FIG. 8. For example, the neural network 1030 may comprise one or more dense layers 1032, which may correspond to the dense layers 822.

The multi-input encoder 1000 may further comprise a concatenation unit 1040 for combining the phoneme or character embedding vector sequence, the compressed representation of the word embedding vector sequence 1004 and the compressed representation of the grammatical parsing information sequence 1006 into mixed text information. For example, the phoneme or character embedding vector sequence, the compressed representation of the word embedding vector sequence and the compressed representation of the grammatical parsing information sequence may be concatenated together in terms of dimensions.

The multi-input encoder 1000 may further comprise a neural network 1050 which is configured for generating a text feature 1008 based on the mixed text information. The neural network 1050 may be based on various network structures. As an example, the neural network 1050 may comprise one or more convolutional layers 1052 and at least one BLSTM layer 1054. The combination of the convolutional layers 1052 and the BLSTM layer 1054 may generate the text feature 1008 based on the mixed text information.

Various types of multi-input encoder according to the embodiments of the present disclosure have been discussed above in connection with FIG. 5 to FIG. 10. However, it should be appreciated that all the architectures or units shown in these multi-input encoders are exemplary, and any changes may be made to them according to actual designs and requirements. In some implementations, although FIG. 6, FIG. 8 and FIG. 10 show that both the word level text information, e.g., word embedding vector sequence, and the sentence level text information, e.g., grammatical parsing information sequence, shall be passed through respective neural networks so as to generate respective compressed representations, and the compressed representations are concatenated with the phoneme or character level information, the neural networks 620, 820, 1020 and 1030 may also be omitted from the multi-input encoders, and thus the word level text information and/or the sentence level text information may concatenate with the phoneme or character level information directly. In some implementations, although FIG. 5 to FIG. 10 show that the embedding of the phoneme or character sequence is performed in the multi-input encoder, that is, the phoneme or character level text information is obtained inside the multi-input encoder, the embedding of the phoneme or character sequence may also be moved to outside of the multi-input encoder, e.g., performed by an embedding model outside of the multi-input encoder. In this case, a phoneme or character embedding vector sequence as the phoneme or character level text information, instead of the phoneme or character sequence, may be directly provided to the multi-input encoder as input. Therefore, in the present disclosure, the operation of utilizing the phoneme or character level text information for generating a text feature should cover both the case of directly utilizing the phoneme or character level text information which is received from outside of the multi-input encoder, and the case of utilizing the phoneme or character level text information which is generated inside the multi-input encoder.

Figure 11:
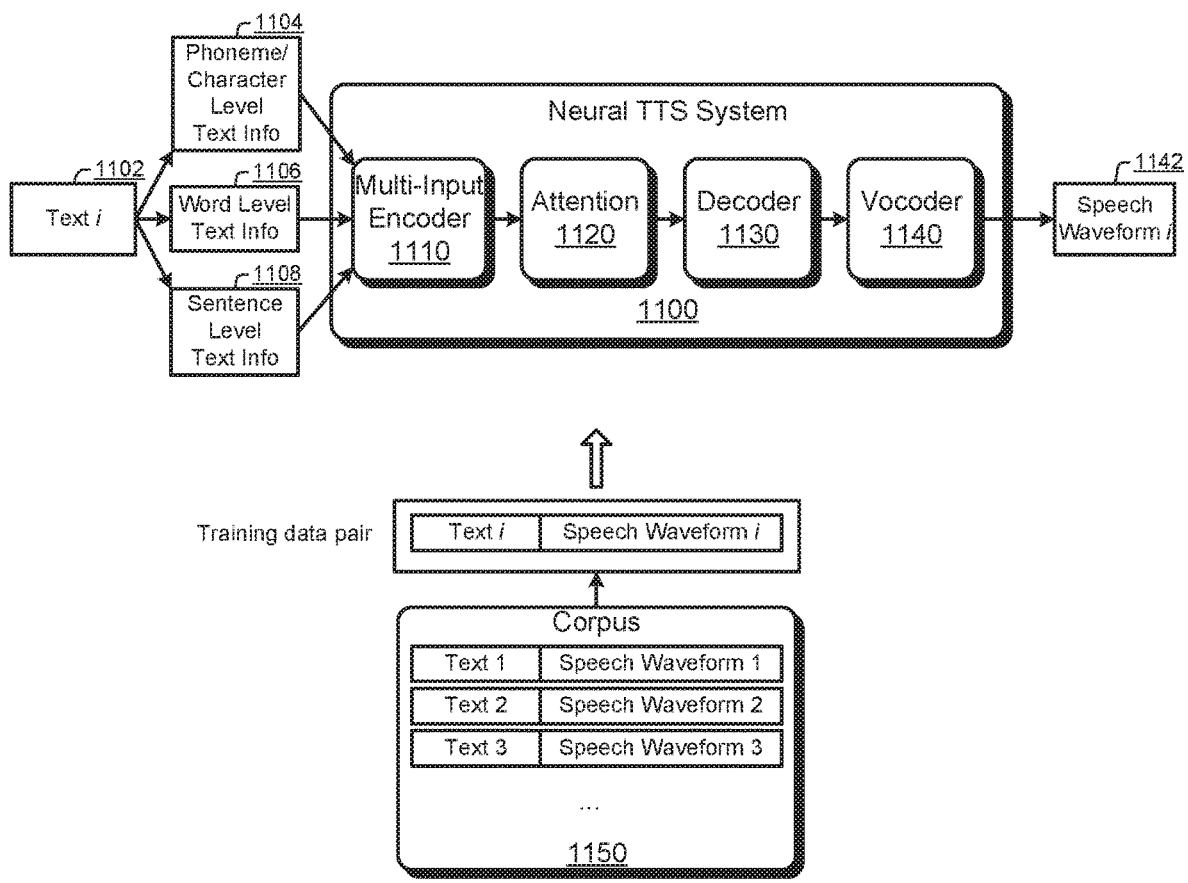
FIG. 11 illustrates an exemplary process for training a neural TTS system according to an embodiment.

FIG. 11 illustrates an exemplary process for training a neural TTS system 1100 according to an embodiment. The neural TTS system 1100 may correspond to the neural TTS system 200 in FIG. 2. The neural TTS system 1100 may comprise a multi-input encoder 1110, an attention unit 1120, a decoder 1130 and a vocoder 1140, which may correspond to the multi-input encoder 210, the attention unit 220, the decoder 230 and the vocoder 240 respectively.

The training of the neural TTS system 1100 may be based on a training corpus 1150. The training corpus 1150 may comprise a plurality of text-speech data pairs, e.g., [text 1, speech waveform 1], [text 2, speech waveform 2], [text 3, speech waveform 3], etc. The data pairs in the training corpus 1150 may be retrieved as training data pairs for training the neural TTS system 1100.

Taking a training data pair [text i, speech waveform i] in the training corpus 1150 as an example, the text i may be used as a text input 1102 for the neural TTS system 1100, and the speech waveform i may be used as an output 1142 by the neural TTS system 1100. Based on the text input 1102, multi-level text information may be generated. For example, a phoneme or character level text information 1104 and at least one type of context-sensitive text information may be generated, wherein the context-sensitive text information may comprise, e.g., word level text information 1106 and/or sentence level text information 1108. The generating of the multi-level text information may be based on the processes discussed above in connection with FIG. 2 to FIG. 4. The generated multi-level text information may be provided to the multi-input encoder 1110. Therefore, the neural TTS system 1100 may be trained based at least on the multi-level text information generated from the text input 1102 and the speech waveform 1142. It should be appreciated that the word embedding involved in the process of obtaining the word level text information 1106 and the grammatical parsing involved in the process of obtaining the sentence level text information 1108 may be trained independently from the neural TTS system 1100. Moreover, the phoneme or character embedding involved in the process of obtaining the phoneme or character level text information 1104, e.g., a phoneme or character embedding model for implementing the phoneme or character embedding, may be initialized randomly and trained jointly with the other parts of the neural TTS system 1100. Alternatively, the phoneme or character embedding model may also be trained independently from the neural TTS system 1100. Furthermore, the vocoder 1140 may be trained jointly with the multi-input encoder 1110, the attention unit 1120 and the decoder 1130, or alternatively may be trained independently from the multi-input encoder 1110, the attention unit 1120 and the decoder 1130.

Figure 12:
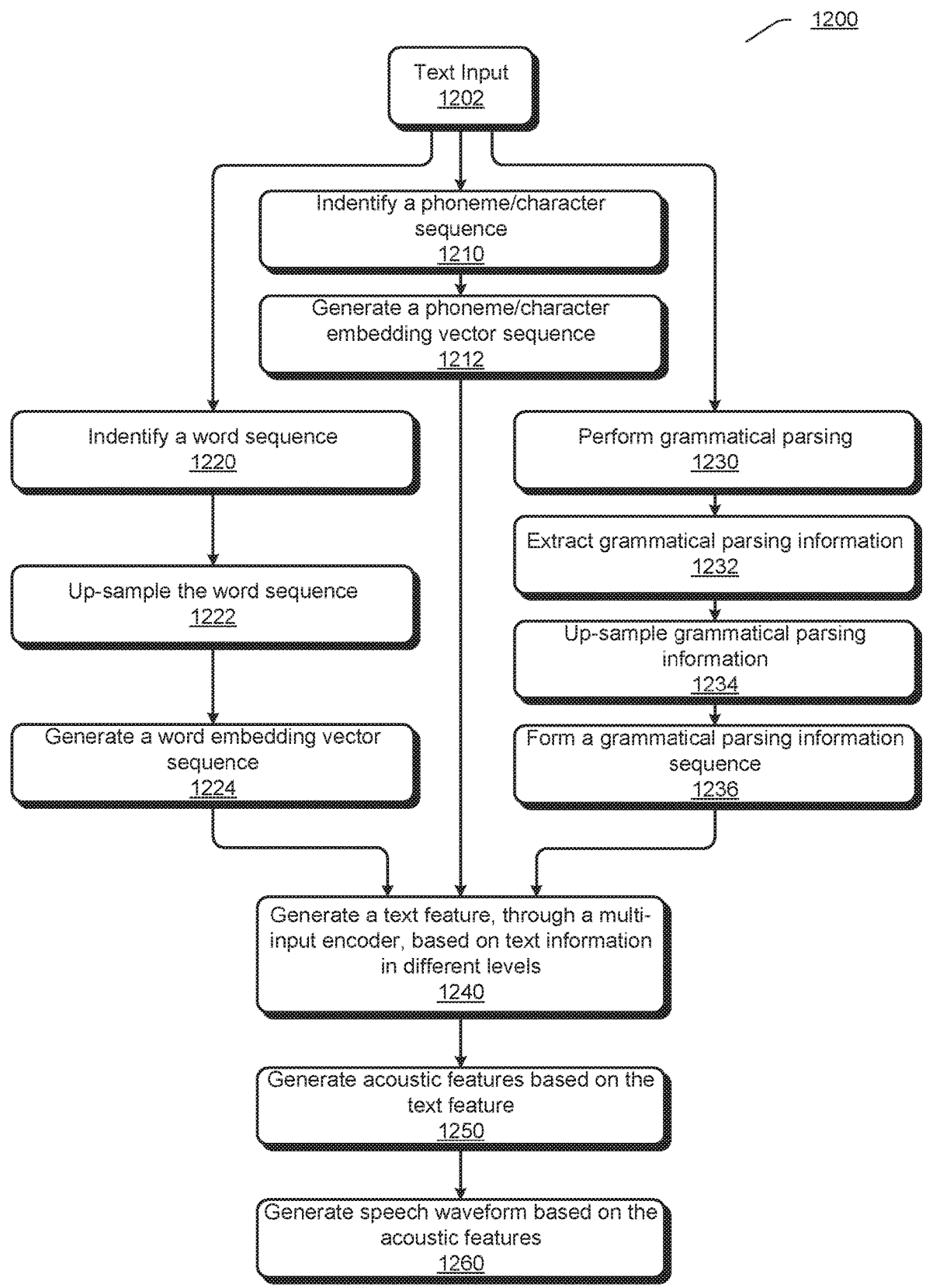
FIG. 12 illustrates an exemplary processing flow for generating a speech waveform according to an embodiment.

FIG. 12 illustrates an exemplary processing flow 1200 for generating a speech waveform according to an embodiment.

At 1202, a text input may be obtained. The processing flow 1200 may further generate multi-level text information from the text input.

In an aspect, a phoneme or character level text information may be generated based on the text input. For example, at 1210, a phoneme or character sequence may be identified from the text input, and then, at 1212, a phoneme or character embedding vector sequence may be generated based on the phoneme or character sequence through, e.g., a phoneme or character embedding model.

In another aspect, context-sensitive text information may be generated based on the text input. The context-sensitive text information may comprise, e.g., word level text information and/or sentence level text information.

In an implementation, at 1220, a word sequence may be identified from the text input. Optionally, at 1222, the word sequence may be up-sampled so as to align with the phoneme or character sequence of the text input. At 1224, a word embedding vector sequence may be generated based on the word sequence or the up-sampled word sequence through, e.g., a word embedding model. The word embedding vector sequence may be viewed as a type of word level text information.

In an implementation, at 1230, grammatical parsing may be performed on the text input to obtain a grammatical structure of the text input. The processing flow 1200 may generate sentence level text information, e.g., grammatical parsing information sequence, based on the grammatical structure. For example, at 1232, grammatical parsing information of each word in the text input may be extracted from the grammatical structure. At 1234, optionally, the grammatical parsing information of each word may be up-sampled so as to align with the phoneme or character sequence of the text input. At 1236, a grammatical parsing information sequence may be formed through combining up-sampled grammatical parsing information of all the words in the text input.

At 1240, a text feature may be generated, through a multi-input encoder, based on the text information in different levels that are provided by the steps 1212, 1224 and/or 1236. For example, the text feature may be generated based on the phoneme or character level text information and at least one type of context-sensitive text information.

The processing flow 1200 may further generate a speech waveform corresponding to the text input based at least on the text feature. For example, at 1250, acoustic features may be generated based on the text feature, and then at 1260, the acoustic features may be further used for generating a speech waveform.

It should be appreciated that, depending on specific designs and requirements, any steps and step orders in the processing flow 1200 may be adjusted, omitted or replaced according to the embodiments of the present disclosure. Any additional steps may also be added into the processing flow 1200.

As discussed above, the embodiments of the present disclosure propose a neural TTS system which may comprise: a multi-input encoder, configured for generating a text feature corresponding to a text input; a decoder, configured for generating acoustic features corresponding to the text feature through an attention mechanism; and a vocoder, configured for generating a speech waveform corresponding to the text input based on the acoustic features. The multi-input encoder may be further configured for generating the text feature through: generating phoneme or character level text information based on the text input; obtaining context-sensitive text information corresponding to the text input; and generating the text feature based on the phoneme or character level text information and the context-sensitive text information. Moreover, the multi-input encoder may also be configured for performing any operations of the methods for generating a text feature during generating speech through neural TTS synthesis according to the embodiments of the present disclosure as mentioned above.

Figure 13:
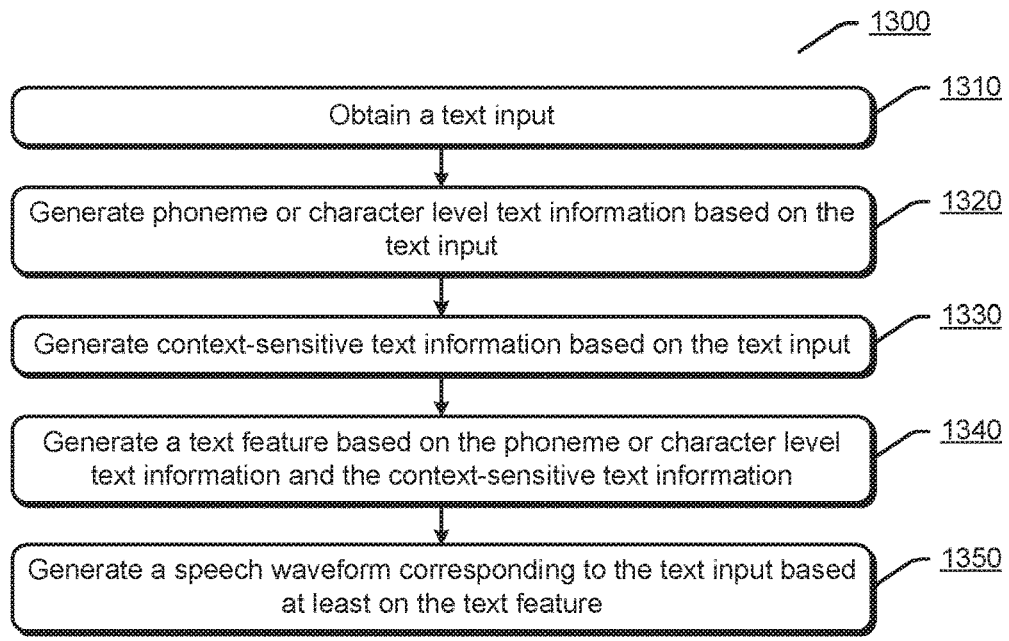
FIG. 13 illustrates a flowchart of an exemplary method for generating speech through neural TTS synthesis according to an embodiment.

FIG. 13 illustrates a flowchart of an exemplary method 1300 for generating speech through neural TTS synthesis according to an embodiment.

At 1310, a text input may be obtained.

At 1320, phoneme or character level text information may be generated based on the text input.

At 1330, context-sensitive text information may be generated based on the text input.

At 1340, a text feature may be generated based on the phoneme or character level text information and the context-sensitive text information.

At 1350, a speech waveform corresponding to the text input may be generated based at least on the text feature.

In an implementation, the phoneme or character level text information may comprise a phoneme or character embedding vector sequence. The generating the phoneme or character level text information may comprise: identifying a phoneme or character sequence from the text input; and generating the phoneme or character embedding vector sequence based on the phoneme or character sequence through a phoneme or character embedding model.

In an implementation, the context-sensitive text information may comprise word level text information. The generating the context-sensitive text information may comprise generating the word level text information. The word level text information may comprise a word embedding vector sequence. The generating the word level text information may comprise: identifying a word sequence from the text input; and generating the word embedding vector sequence based on the word sequence through a word embedding model. The generating the word embedding vector sequence may comprise: up-sampling the word sequence to align with a phoneme or character sequence of the text input; and generating the word embedding vector sequence based on the up-sampled word sequence through the word embedding model. The word embedding model may be based on NMT. The generating the text feature may comprise: generating the text feature based on the phoneme or character level text information and the word level text information.

In an implementation, the context-sensitive text information may comprise sentence level text information. The generating the context-sensitive text information may comprise generating the sentence level text information. The sentence level text information may comprise a grammatical parsing information sequence. The generating the sentence level text information may comprise: performing grammatical parsing on the text input to obtain a grammatical structure of the text input; and generating the grammatical parsing information sequence based on the grammatical structure. The generating the grammatical parsing information sequence may comprise: extracting grammatical parsing information of each word in the text input from the grammatical structure: up-sampling the grammatical parsing information of each word to align with corresponding phonemes or characters in a phoneme or character sequence of the text input; and combining up-sampled grammatical parsing information of all the words in the text input into the grammatical parsing information sequence. The grammatical parsing information of each word may comprise at least one of; an indication of phrase type of at least one phrase containing the word; an indication of whether the word is a border of the at least one phrase; and an indication of relative position of the word in the at least one phrase. The generating the text feature may comprise: generating the text feature based on the phoneme or character level text information and the sentence level text information.

In an implementation, the context-sensitive text information may comprise both word level text information and sentence level text information. The generating the context-sensitive text information may comprise: generating the word level text information; and generating the sentence level text information. The generating the text feature may comprise: generating the text feature based on the phoneme or character level text information, the word level text information and the sentence level text information.

In an implementation, the context-sensitive text information may comprise word level text information and/or sentence level text information. The generating the text feature may comprise: generating a first text feature based on the phoneme or character level text information through a first neural network; generating at least one second text feature based on the word level text information and/or the sentence level text information comprised in the context-sensitive text information through at least one second neural network; and generating the text feature through concatenating the first text feature with the at least one second text feature.

In an implementation, the context-sensitive text information may comprise word level text information and/or sentence level text information. The generating the text feature may comprise: concatenating the phoneme or character level text information with the word level text information and/or the sentence level text information comprised in the context-sensitive text information, to form mixed text information; and generating the text feature based on the mixed text information through a first neural network.

In an implementation, the context-sensitive text information may comprise word level text information and/or sentence level text information. The generating the text feature may comprise: generating at least one compressed representation of the word level text information and/or the sentence level text information comprised in the context-sensitive text information through at least one first neural network; concatenating the phoneme or character level text information with the at least one compressed representation to form mixed text information; and generating the text feature based on the mixed text information through a second neural network.

It should be appreciated that the method 1300 may further comprise any steps/processes for generating speech through neural TTS synthesis according to the embodiments of the present disclosure as mentioned above.

Figure 14:
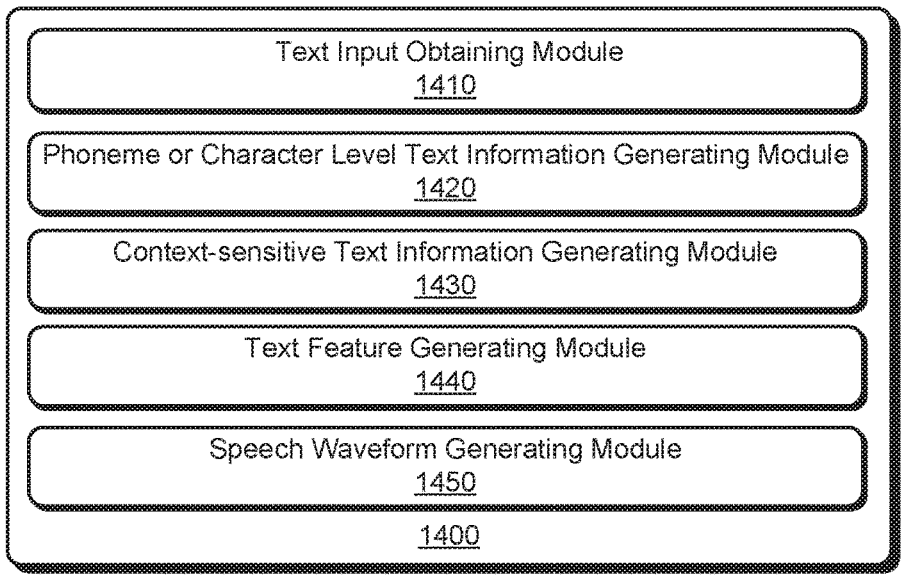
FIG. 14 illustrates an exemplary apparatus for generating speech through neural TTS synthesis according to an embodiment.

FIG. 14 illustrates an exemplary apparatus 1400 for generating speech through neural TTS synthesis according to an embodiment.

The apparatus 1400 may comprise: a text input obtaining module 1410, for obtaining a text input; a phoneme or character level text information generating module 1420, for generating phoneme or character level text information based on the text input; a context-sensitive text information generating module 1430, for generating context-sensitive text information based on the text input; a text feature generating module 1440, for generating a text feature based on the phoneme or character level text information and the context-sensitive text information; and a speech waveform generating module 1450, for generating a speech waveform corresponding to the text input based at least on the text feature.

Moreover, the apparatus 1400 may also comprise any other modules configured for generating speech through neural TTS synthesis according to the embodiments of the present disclosure as mentioned above.

Figure 15:
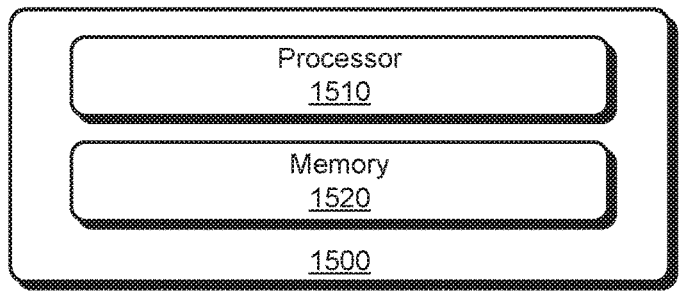
FIG. 15 illustrates an exemplary apparatus for generating speech through neural TTS synthesis according to an embodiment.

FIG. 15 illustrates an exemplary apparatus 1500 for generating speech through neural TTS synthesis according to an embodiment.

The apparatus 1500 may comprise at least one processor 1510 and a memory 1520 storing computer-executable instructions. When executing the computer-executable instructions, the at least one processor 1510 may: obtain a text input; generate phoneme or character level text information based on the text input; generate context-sensitive text information based on the text input; generate a text feature based on the phoneme or character level text information and the context-sensitive text information; and generate a speech waveform corresponding to the text input based at least on the text feature. The at least one processor 1510 may be further configured for performing any operations of the methods for generating speech through neural TTS synthesis according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for generating speech through neural TTS synthesis according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are expressly incorporated herein by reference and are intended to be encompassed by the claims.

What is claimed is:

1. A method for generating speech through neural text-to-speech (TTS) synthesis, comprising:
    obtaining a text input having a sequence;
    generating phoneme or character level text information based on the text input;
    generating context-sensitive text information among words based on the text input, the context-sensitive text information having word level text information where generating the context-sensitive text information comprises:
        identifying a word sequence from the text input;
        up-sampling the word sequence to align with the text input;
        generating a word embedding vector sequence of the word sequence and a phoneme vector sequence;
    generating sentence level text information having a grammatical parsing information sequence, wherein generating the sentence level text information comprises:
        performing grammatical parsing on the text input to obtain a grammatical structure of the text input; and
        generating the grammatical parsing information sequence based on the grammatical structure of the text input by:
            extracting grammatical parsing information of each word in the text input from the grammatical structure;
            up-sampling the grammatical parsing information of each word to align with corresponding phonemes or characters in a phoneme or character sequence of the text input thereby generating a grammatical parsing information sequence; and
    combining a phoneme vector sequence, the word embedding vector sequence and the grammatical parsing information sequence;
    generating a text feature via a multi-input encoder coupled to receive the phoneme or character level text information and the word embedding vector sequence as inputs;
    generating acoustic features from the text feature via a decoder; and
    generating a speech waveform corresponding to the text input based at least on the text feature.

2. The method of claim 1, wherein word embedding vector is generated with a word embedding model that is based on neural machine translation (NMT).

3. The method of claim 1, wherein the generating the text feature comprises:
    generating the text feature based on the phoneme or character level text information and the word level text information.

4. The method of claim 1, wherein the grammatical parsing information of each word comprises at least one of:
    an indication of phrase type of at least one phrase containing a word;
    an indication of whether the word is a border of the at least one phrase; and
    an indication of relative position of the word in the at least one phrase.

5. The method of claim 1, wherein the generating the text feature comprises:
    generating the text feature based on the phoneme or character level text information and the sentence level text information.

6. The method of claim 1, wherein the generating the text feature comprises:
    generating the text feature based on the phoneme or character level text information, the word level text information and the sentence level text information.

7. The method of claim 1, wherein the generating the text feature comprises:
    generating a first text feature based on the phoneme or character level text information through a first neural network;
    generating at least one second text feature based on the word level text information and/or the sentence level text information comprised in the context-sensitive text information through at least one second neural network; and
    generating the text feature through concatenating the first text feature with the at least one second text feature.

8. The method of claim 1, wherein the generating the text feature comprises:
    concatenating the phoneme or character level text information with the word level text information and/or the sentence level text information comprised in the context-sensitive text information, to form mixed text information; and
    generating the text feature based on the mixed text information through a first neural network.

9. The method of claim 1, wherein the generating the text feature comprises:
    generating at least one compressed representation of the word level text information and/or the sentence level text information comprised in the context-sensitive text information through at least one first neural network;
    concatenating the phoneme or character level text information with the at least one compressed representation to form mixed text information; and generating the text feature based on the mixed text information through a second neural network.

10. An apparatus for generating speech through neural text-to-speech (TTS) synthesis, comprising:
a text input obtaining module, for obtaining a text input having a sequence;
a phoneme or character level text information generating module, for generating phoneme or character level text information based on the text input;
a context-sensitive text information generating module, for generating context-sensitive text information among words based on the text input, the context-sensitive text information having word level text information where generating the context-sensitive text information comprises:
identifying a word sequence from the text input; and
up-sampling the word sequence to align with the text input; generating a word embedding vector sequence of the word sequence and a phoneme vector sequence;
generating sentence level text information having a grammatical parsing information sequence, wherein generating the sentence level text information comprises:
performing grammatical parsing on the text input to obtain a grammatical structure of the text input; and
generating the grammatical parsing information sequence based on the grammatical structure of the text input by:
extracting grammatical parsing information of each word in the text input from the grammatical structure;
up-sampling the grammatical parsing information of each word to align with corresponding phonemes or characters in a phoneme or character sequence of the text input thereby generating a grammatical parsing information sequence; and
combining a phoneme vector sequence, the word embedding vector sequence and the grammatical parsing information sequence;
a text feature generating module comprising a multi-input encoder, for generating a text feature from inputs including the phoneme or character level text information and the word embedding vector sequence as inputs;
an acoustic features generating module comprising a decoder for generating acoustic features from the text feature; and
a speech waveform generating module, for generating a speech waveform corresponding to the text input based at least on the text feature.

11. An apparatus for generating speech through neural text-to-speech (TTS) synthesis, comprising:
at least one processor; and
a memory storing computer-executable instructions that, when executed, cause the at least one processor to:
obtain a text input having a sequence;
generate phoneme or character level text information and context-sensitive text information among words based on the text input, the context-sensitive text information having word level text information where generating the context-sensitive text information comprises:
identifying a word sequence from the text input;
up-sampling the word sequence to align with the text input;
generating a word embedding vector sequence of the word sequence and a phoneme vector sequence;
generating sentence level text information having a grammatical parsing information sequence, wherein generating the sentence level text information comprises:
performing grammatical parsing on the text input to obtain a grammatical structure of the text input; and
generating the grammatical parsing information sequence based on the grammatical structure of the text input by:
extracting grammatical parsing information of each word in the text input from the grammatical structure;
up-sampling the grammatical parsing information of each word to align with corresponding phonemes or characters in a phoneme or character sequence of the text input thereby generating a grammatical parsing information sequence; and
combining a phoneme vector sequence, the word embedding vector sequence and the grammatical parsing information sequence;
generate context-sensitive text information among words based on the text input;
generate a text feature via a multi-input encoder coupled to receive the phoneme or character level text information and the word embedding vector sequence as inputs;
generate acoustic features from the text feature via a decoder, and
generate a speech waveform corresponding to the text input based at least on the text feature.

* * * * *